United States Patent [19]
Berner et al.

[11] Patent Number: 5,907,846
[45] Date of Patent: *May 25, 1999

[54] METHOD AND SYSTEM FOR ACCESSING RELATIONAL DATABASES USING OBJECTS

[75] Inventors: Andrew J. Berner, Irving, Tex.; Kathryn A. Rosenthal, Beaconsfield, United Kingdom

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,580

[22] Filed: Jun. 7, 1996

[51] Int. Cl.$^6$ ..................................................... G06F 17/30
[52] U.S. Cl. ........................................... 707/103; 707/104
[58] Field of Search ..................................... 395/612, 614, 395/604, 605, 606; 707/101, 103, 4, 5, 6, 104

[56] References Cited

U.S. PATENT DOCUMENTS

| | | | |
|---|---|---|---|
| 4,930,071 | 5/1990 | Tou et al. | 364/300 |
| 5,133,075 | 7/1992 | Risch | 395/800 |
| 5,212,787 | 5/1993 | Baker et al. | 395/600 |
| 5,235,701 | 8/1993 | Ohler et al. | 395/600 |
| 5,291,583 | 3/1994 | Bapat | 395/500 |
| 5,295,256 | 3/1994 | Bapat | 395/504 |
| 5,297,279 | 3/1994 | Bannon et al. | 395/600 |
| 5,317,742 | 5/1994 | Bapat | 395/714 |
| 5,426,780 | 6/1995 | Gerull et al. | 395/600 |
| 5,437,027 | 7/1995 | Bannon et al. | 395/600 |
| 5,448,727 | 9/1995 | Annevelink | 395/612 |
| 5,455,948 | 10/1995 | Poole et al. | 395/650 |
| 5,459,860 | 10/1995 | Burnett et al. | 395/600 |
| 5,471,629 | 11/1995 | Risch | 395/800 |
| 5,473,732 | 12/1995 | Chang | 395/77 |
| 5,499,371 | 3/1996 | Henninger et al. | 395/710 |
| 5,504,885 | 4/1996 | Alashqur | 395/614 |
| 5,542,078 | 7/1996 | Martel et al. | 395/614 |
| 5,548,749 | 8/1996 | Kroenke et al. | 395/612 |
| 5,596,746 | 1/1997 | Shen et al. | 395/612 |
| 5,615,362 | 3/1997 | Jensen et al. | 395/614 |

*Primary Examiner*—Thomas G. Black
*Assistant Examiner*—Frantz Coby
*Attorney, Agent, or Firm*—Anthony E. Peterman; L. Joy Griebenow

[57] ABSTRACT

An object oriented system for accessing an external relational database from within the object oriented system. The system creates an object and fills it with data values retrieved from the database. References from the object to other objects include pointers to preexisting objects or pointers to placeholder objects. Later retrieves fill in the placeholder objects, eliminating the need to reset the pointers. Caching, utilizing static data and static functions, is performed by each class of objects. Sub-objects are used to create different logical views of data from the database, and query access to the database is provided by a query engine which builds query language statements on demand.

21 Claims, 8 Drawing Sheets

PERSONNEL DEPARTMENT VIEW

302

| ID | NAME | AGE | GENDER |
|---|---|---|---|
| 111 | JANE D. | 22 | FEMALE |
| 222 | JOHN D. | 21 | MALE |
| ... | ... | ... | ... |

PAYROLL DEPARTMENT VIEW

304

| NAME | ID | JOB GRADE | SALARY |
|---|---|---|---|
| JANE D. | 111 | L5 | 35000 |
| JOHN D. | 222 | L4 | 28000 |
| ... | ... | ... | ... |

306

| ID | NAME | PROJECT NAME | LOCATION |
|---|---|---|---|
| 111 | JANE D. | ALPHA | 4TH FLR |
| 222 | JOHN D. | ALPHA | 4TH FLR |
| ... | ... | ... | ... |

METHOD AND SYSTEM FOR ACCESSING RELATIONAL DATABASES USING OBJECTS

FIELD OF THE INVENTION

This invention relates to computer systems and in particular to data retrieval within a computer system. Even more particularly, the invention relates to retrieval of data from a relational database from within an object oriented environment.

BACKGROUND OF THE INVENTION

Object oriented software development within computer systems, while no longer new, is still growing. Techniques and methodologies have not yet become standardized and object oriented databases are lagging behind object oriented software development in other areas. Direct storage of objects on nonvolatile mass storage is not widely available.

Relational database technology is mature and widely available, with a choice of vendors available for almost any development platform. Languages and access techniques are standardized and database structure optimization is well understood. Additionally, new applications may have to integrate with legacy data already stored in existing relational databases.

This combination of circumstances leads a large number of object oriented software developers to rely on conventional relational databases for data storage. Using conventional relational databases within an object oriented software environment, however, has its own drawbacks. First among these is that the structure of the object oriented environment and the structure of the relational database environment are different.

Conceptually, an object is an encapsulated set of data fields along with the processing functions that operate on data contained within the fields. Objects are organized into classes where all objects of a class share a common pattern of data fields and processing functions. Each individual object of a class has its own identity that differs from other objects of the same class, and typically has unique values stored in its data fields. Logical relationships between objects are often implemented by using pointers to provide direct access from one object to another object.

Relational databases use a flat, tabular format to store data. Data is partitioned into tables and then into columns within the tables. A particular set of data is stored as a row within a table, or the set may be split into two or more rows, with each row stored in a different table.

Within a relational database, no provision is made for storing any of the processing functions that operate on the data stored within the relational database. Relationships between the data tables are implemented by using corresponding columns, known as key fields, in the separate tables. A matching value within corresponding columns of two tables indicates related row entries between the tables.

Because of this difference in structure between the object oriented environment and the relational database environment, an object cannot be directly stored into a relational database. Instead, some mapping technique must be applied to convert between objects and database tables. Some of these techniques are well known, and some have been automated. One technique is to use a table for a class of objects, define a column in the table that corresponds to each data field in the class, and store the values for each individual object as a row of the table. Pointer references between objects are converted into key field values for storage in the database. The functions for the objects are stored separately, usually as a part of the software program which is executed to perform the processing. Existing mapping techniques either result in a poor relational database model, a poor object model, or limited use of the capability of the relational database management system to retrieve precisely the data needed with a single query.

Database access from within the object oriented environment is typically implemented by either embedding query language statements within the functions of the class of objects, or by utilizing library routines, called from the functions, to retrieve or store data. The embedded approach requires that the programmer know both the database query language and the development language for the objects, while the use of library routines often limits the query capability to a subset implemented by the library.

A difficulty arises when an object is retrieved from the database, and the retrieved object refers to a second object. If the second object has been previously retrieved from the database, so that it already exists within the object oriented environment, a pointer reference to the second object can be obtained and stored in the retrieved object. However, if the second object has not been retrieved from the database, so that the second object does not yet exist within the object oriented environment, a pointer reference cannot be used. Since the reference from the retrieved object to the second object cannot be resolved, the second object pointer must be marked as unusable in the retrieved object, until such time as the second object is retrieved. Once the second object is retrieved, the system must locate all of the previously retrieved objects that have unusable pointers to the second object, and update their pointer references, so that the now retrieved second object is accessible through the pointer references. This updating process can take considerable processing time, and programming for this situation is error prone.

The concept of multiple logical views of data is well known in the database field and this concept has been extended to retrieval of objects from relational databases. In implementing logical views, a subset of the data from a database, that corresponds to an object, is retrieved and defined as an object in the object oriented environment. Other views of the database would utilize a different subset of the data, likely with overlapping contents. Typically, when multiple views of the same database are retrieved, they are stored separately in memory. This results in duplicate storage of the overlapping data values and creates a coherency problem when one of the copies of the overlapping data is modified. A performance penalty is also incurred, because duplicated data may be retrieved from the database more than once, since it is not usually possible to retrieve only the non-duplicated data when a new view is needed. This approach also violates the concept of object identity where each object has its own identity, even if it has the same data values as another object, and all references to that object point to a single copy.

Caching techniques are also well known in the computer industry. The use of a cache reduces the processing time spent retrieving data from storage devices such as disk drives. When a set of data is retrieved, it is placed on the cache, in memory. A later request for the same set of data is satisfied by using the cache copy rather than again retrieving the set of data a second time from disk. Techniques for maintaining the coherency of the cache copy and the disk copy when one is modified, are also well known.

Traditional caching techniques typically utilize a single, monolithic cache associated with one or more storage devices. All requests for data for a device are processed by the same cache without regard to what program submitted the request. While efficient from the aspect of processing time, this approach is undesirable in terms of software design. To efficiently utilize a cache, a software program must have the ability to determine which data should be cached and which should not. It must also be able to flush certain data from the cache when the data is no longer needed. With a traditional monolithic cache, this requires that the program interact with an entity, the cache, that is outside of the program, thus forming a coupling between each program that uses a storage device and the cache software for the device cache. This coupling to an external entity makes the program dependent on a specific system configuration, reducing its flexibility, and it also restricts the reuse of the program across multiple computer systems.

There is a need in the art for a method of retrieving data from a relational database into an object oriented environment that maintains object identity, while eliminating the problems of duplicate storage and data coherency. There is also a need for such a system that can correctly resolve references to later loaded objects without the need to update pointers in preexisting objects. There is a further need for such a system to provide an in-memory cache without coupling the objects to an external entity. A still further need is for such a system that provides flexible access to the database without requiring that the object developer know the query language of the database.

SUMMARY OF THE INVENTION

It is an aspect of the present invention to retrieve data from a relational database into an object oriented environment.

It is another aspect of the invention to delay retrieval of secondary objects, such as associated objects and sub-objects, and to create placeholder objects for these secondary objects when a retrieved object refers to the secondary object, but the secondary object has not been retrieved from the database.

Another aspect of the invention is to provide a mechanism for encapsulating query language commands, thus freeing a developer from the need to know the query language.

Still another aspect of the invention is to divide objects into one or more sub-objects, wherein sub-objects contain different segments of data that support different logical views of an object.

A further aspect of the invention is to cache data for objects within each class of objects.

A still further aspect of the invention is to maintain a persistence status for all objects held in memory.

The above and other aspects of the invention are accomplished in a system for converting relational database information into objects. When the system is called to retrieve data from a relational database, the system creates an object, retrieves the data for the object from the database, and stores the data in the object. If the created object contains a reference to additional data that is, or will become, a second object, the system resolves this reference by creating a pointer within the object for this additional data. If the additional data already exists as a second object within the object oriented environment, the reference is resolved as a pointer to the second object. If the object for the additional data has not yet been created, the system creates an empty second object, called a placeholder object, and resolves the reference as a pointer to the placeholder object. Other objects, created later, can also point to this placeholder object.

When the data for a placeholder object is required, the data is retrieved from the database and stored into the existing placeholder object in memory. By not relocating or replacing the placeholder objects, all previously existing links to the placeholder object automatically point to the object after it has been filled in with data. The processing overhead of updating pointers from other objects is eliminated.

Objects can be divided into one or more sub-objects. These sub-objects may contain different segments of data that support different logical views of the object. Each sub-object is treated separately by the retrieval and caching process. One result of this is that a particular sub-object is retrieved only once, no matter how many of the logical views use it. Problems of redundant storage and coherency are eliminated because all references use the same copy of the sub-object. When a new view is activated, the system will retrieve only the required sub-objects that have not been retrieved from the database.

Because all view retrievers inherit mapping information from a generic retriever, when the mapping information changes, the changes are all in one location, within the generic retriever. The view retrievers use this mapping information to build requests to a database query engine. The query engine builds query language commands and submits them to the database on demand. Since the engine is not limited to filling in specific parameters, the engine can build commands dynamically out of the component clauses, giving the developer flexibility to utilize the strengths of the relational database management system while not requiring a knowledge of the query language used.

Each class of objects provides a cache for the objects within the class.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The field of object oriented development uses a set of terms and definitions that are sometimes different from conventional development approaches. The following is a brief glossary of terms as used herein.

Object Oriented Environment—An object oriented environment is one in which the software has been partitioned into objects that interact with each other. An object oriented environment may be either a single executable program comprised of one or more objects, or it may be comprised of multiple separately executable programs each of which implements one or more objects.

Object—An object is a set of data fields, combined with the processing functions that operate on the data stored in the data fields. Each object has a separate identity, such that two objects with the same set of data fields and functions, and with the same values stored in the data fields, are distinguishable. A data field in an object may contain data of any complexity and may be a sub-object.

Sub-Object—A sub-object is an object, as defined above, however a sub-object is contained within another object such that the sub-object cannot exist independently of the containing object.

Related Objects—An object may have relationships with other objects. The sub-object relationship described above is one example. Another example is an associated object, which is an independent object, but which contains data related to another object, or performs a function related to another object.

Class—A class is an abstraction of individual objects and serves as a template for the objects. All objects of a class have the same data fields and functions but may differ in the specific values stored in the data fields.

Derived Class—A class that inherits a pattern of data fields and functions from another class, called the parent class, and then adds to or modify the fields and/or functions to perform a more specialized purpose.

Sub-class—a class that is contained within another class, but is not a derived class of the class in which it is contained. The objects of a sub-class are sub-objects.

Static Functions—Static functions implement capabilities needed by a class, but do not use the data values stored in any specific object of the class. Static functions may use static data that is stored with the class and shared by all objects of that class.

References—Objects can interact with each other through references that identify a specific object that is to receive a message. References are often implemented as pointers but can also use other mechanisms, such as keys, that are unique within a class. References allow objects within a class to deliver a message to a specifically identified object within another class.

Message—A message delivers information from one object to another. This information may be specific data values or may consist only of the fact that the particular message was sent. Messages between objects are also implemented in more than one way—sometimes using function calls, while sometimes transmitting one or more data values between objects.

Logical View—The data fields and functions of an object may support more than one logical view of that object. A logical view is one that presents some aspects of an object that are relevant for a particular purpose while suppressing some aspects that are not relevant for the particular purpose. For example, one logical view might include pay information, that is needed by a payroll department, while another logical view might exclude pay information, since pay information is typically very private and not available to most users of a database.

Data Set—A data set is any combination of data values with a logical relationship. A data set might be all of the data values for an object, those data values that support a particular logical view, those data values in common to two or more logical views, or any other useful combination.

Relational Database—A relational database encompasses any database system that stores data as one or more tables with each table divided into one or more columns. Rows within each table hold a different set of data.

Query Request—A query request is any request sent to a database that retrieves, inserts, or modifies data within the database.

Relational Database Management System—A relational database management system is the software, and any specific hardware, that manages and provides access to one or more logical databases.

Logical Database—A logical database is a set of tables that is associated with a particular task. Typically, a database user is logged in to a single logical database at a time, and that logical database is the default target for all query requests submitted by that user. By making an explicit request, however, a database user can access a logical database different from the logical database into which they are logged.

Figure 1:
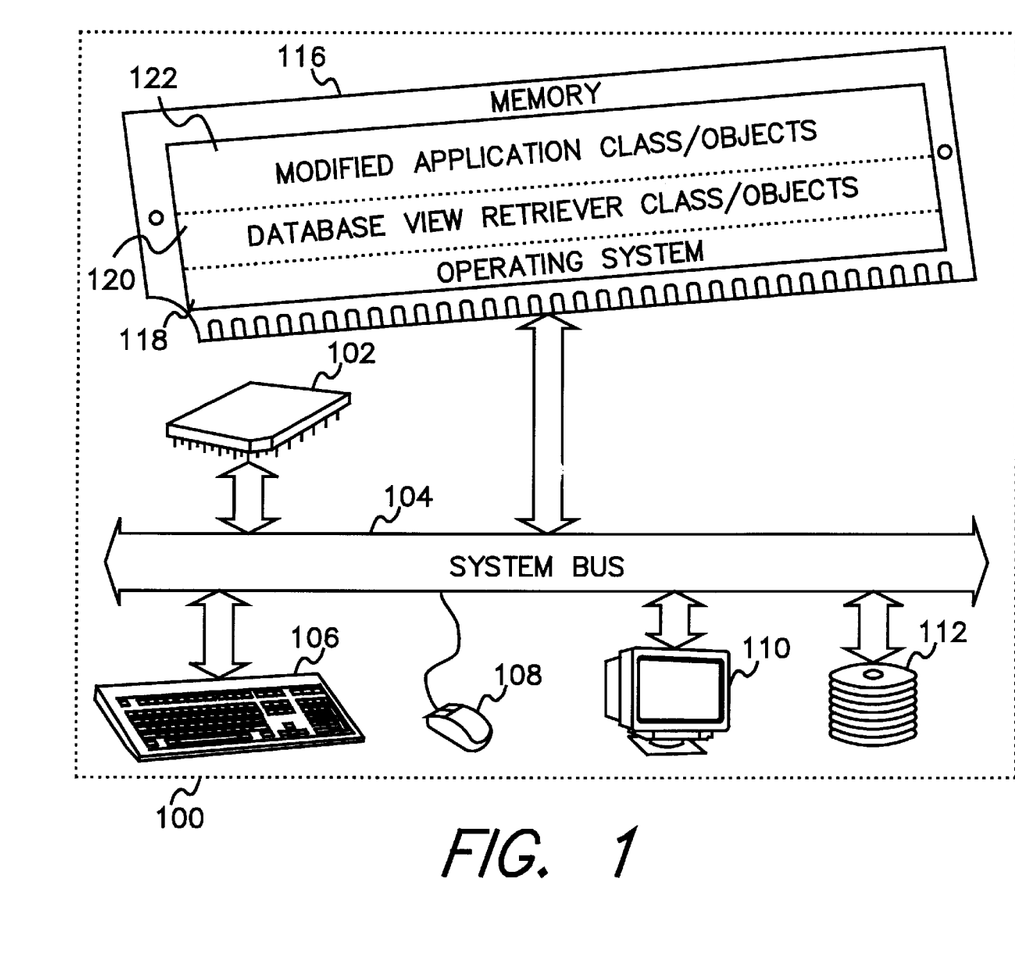
FIG. 1 shows a block diagram of a computer system incorporating the database access objects of the present invention.

FIG. 1 shows a block diagram of a computer system incorporating the present invention. Computer system 100 contains a processing element 102. The processing element 102 communicates to other elements of the computer system over a system bus 104. A keyboard 106 allows text input to the computer system and a mouse device 108 allows locator input to the computer system. A display 110 provides output from the computer system. A disk 112 served as mass storage for the computing system including storage for the relational database and processing functions of the present invention.

A memory 116 contains an operating system 118, which may be any of a plurality of commercially available operating systems. The memory 116 also contains the database view retriever class/objects 120 and the modified application class/objects 122 of the present invention. The processing element 102 of the computer system 100 executes the code portion of the database access objects and application objects and transfers data between the database access objects and the disk 112 as required by the present invention.

Figure 2:
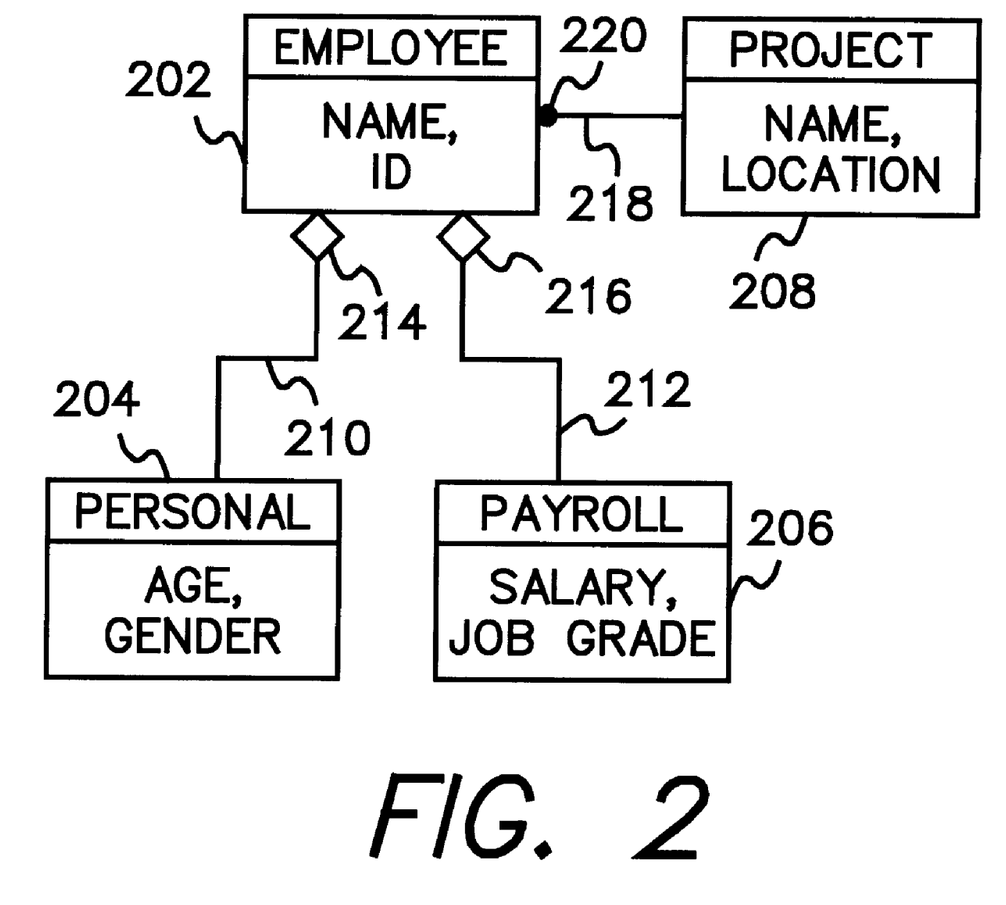
FIG. 2 shows an entity relationship diagram for a sample application class which utilizes the present invention.

FIG. 2 shows a simple class of an example application, that will be used in the following discussions. This simple class is a modified application class, as will be more fully described below with respect to FIG. 4. The example application comprises an employee information system shared by personnel and payroll departments of a company. Although all of the classes contain processing functions, in this example they have been omitted for simplicity; only the names and data fields for the classes are shown. The Employee class 202 contains the data fields that are common to all uses of the class, such as the Name and ID of the employee.

The Employee class is comprised of two subclasses: Personal 204 and Payroll 206. This sub-class relationship is indicated by the diamonds 214 and 216 located at the beginning of lines 210 and 212 that connect the classes. This relationship between the classes means that every object of the Employee class has a Personal class sub-object and a Payroll class sub-object. These sub-objects are called application sub-objects. The subclasses contain data fields needed for one or more of the uses of the Employee class, but not needed for all the uses of the class.

Project class 208 is an associated object of the Employee class. In contrast to the Personal and Payroll classes, the Project class is not a part of the Employee class, but is external to the Employee class. Each object of the Employee class has a relationship to a single object of the Project class but an object of the Project class may be related to many different objects of the Employee class. This one-to-many relationship is indicated by the line 218 that connects the two classes, wherein the "many" side of the relationship is indicated by the solid ball 220.

Figure 3:
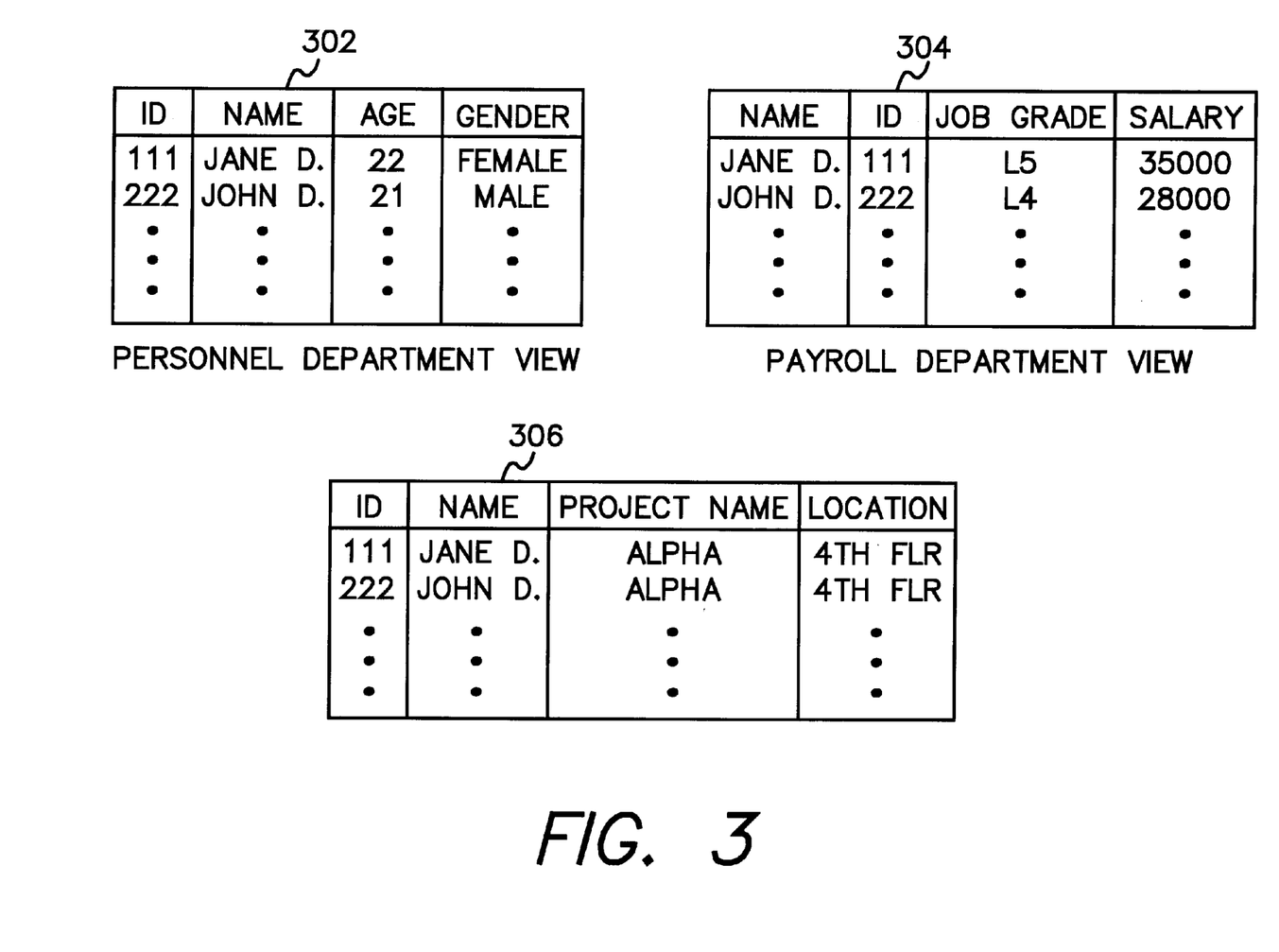
FIG. 3 shows three example logical views of the data for the sample application.

FIG. 3 shows three examples of logical views represented as data tables containing data fields from the classes shown in FIG. 2. These three views each present a subset of the available data, wherein the subset is tailored to a specific purpose.

A personnel department view 302 includes the ID, Name, Age, and Gender for each employee, drawing on data from the Employee class 202 (FIG. 2) and the Personal class 204 (FIG. 2). This view provides data which would be useful for tasks performed only by the personnel department, such as determining compliance with equal opportunity hiring guidelines.

In contrast, a payroll department view 304 uses ID, Name, Job Grade and Salary from the Employee 202 and Payroll 206 classes (FIG. 2), however, this view contains no information from the Personal class. This payroll department view supports the generation of paychecks, which is a task unique to the payroll department. While the personnel department view organizes the data by ID, the payroll view organizes the data by name, as indicated by the first column in each table.

A project management view 306 also uses Name and ID from the Employee class but merges this data with project Name and Location from the Project class 208 to provide information suitable for a variety of management tasks such as resource allocation.

Figure 4:
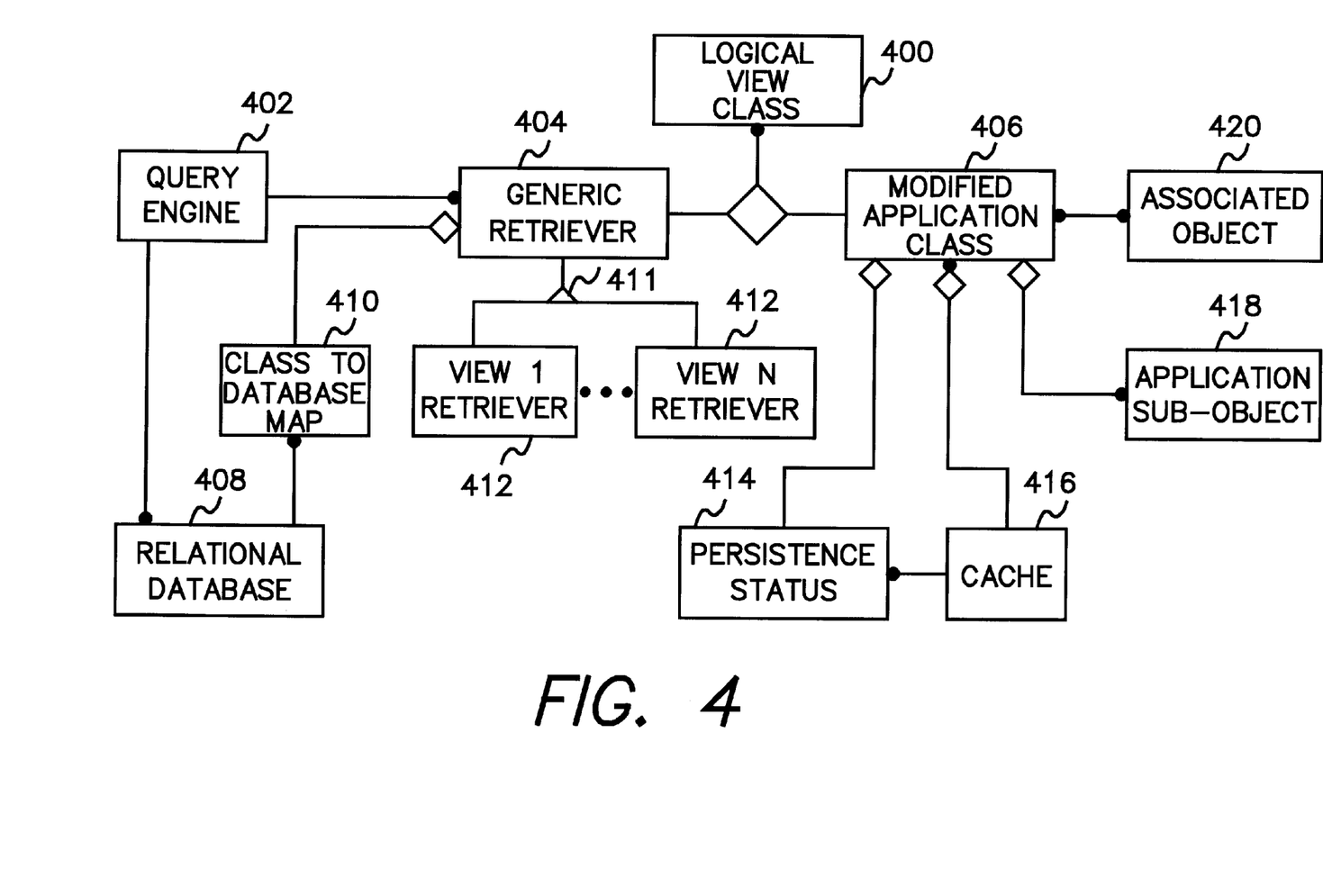
FIG. 4 shows an entity relationship diagram of the classes comprising a software component of the invention, and the relationships between these classes.

FIG. 4 shows a block diagram of the architecture of the present invention. Referring to FIG. 4, the invention includes a conventional relational database 408, a modified application class 406, and other classes specific to the disclosed invention. The objects of the invention execute within an object oriented environment while the relational database 408 is outside of the object oriented environment.

A modified application class is a class such as Employee 202 (FIG. 2), that is specific to the application being supported by the invention. Many different classes from the application may be modified to make use of the invention.

The modified application class 406 is adapted to allow it to use the disclosed invention to access the relational database 408. These adaptations include adding a persistence status sub-object 414, adding a shared cache sub-object 416, adding database access functions (not shown), adding an on-cache status data field (not shown), and altering the class's functions, which change the data fields of the class to properly update the information contained in the persistence status sub-object 414. The database access functions in the objects of the modified application class send request messages, specifying the data needed from the database, to view retrievers 412 and receive response objects from the view retrievers 412, wherein the response objects contain the retrieved data.

Performance of the process of retrieving data values from the relational database is further improved through the use of an object cache 416 in FIG. 4. An object cache stores copies of objects within the object oriented environment so that they are available more quickly than is possible by creating them and retrieving their data values from the database. When an object is created and its data values retrieved, the object can be placed on the cache. Later requests for data values from the same object are resolved by returning a reference to the copy of the object on the cache. In the preferred embodiment, the cache mechanism is implemented at the class level through the use of static functions and static data structures.

Figure 5:
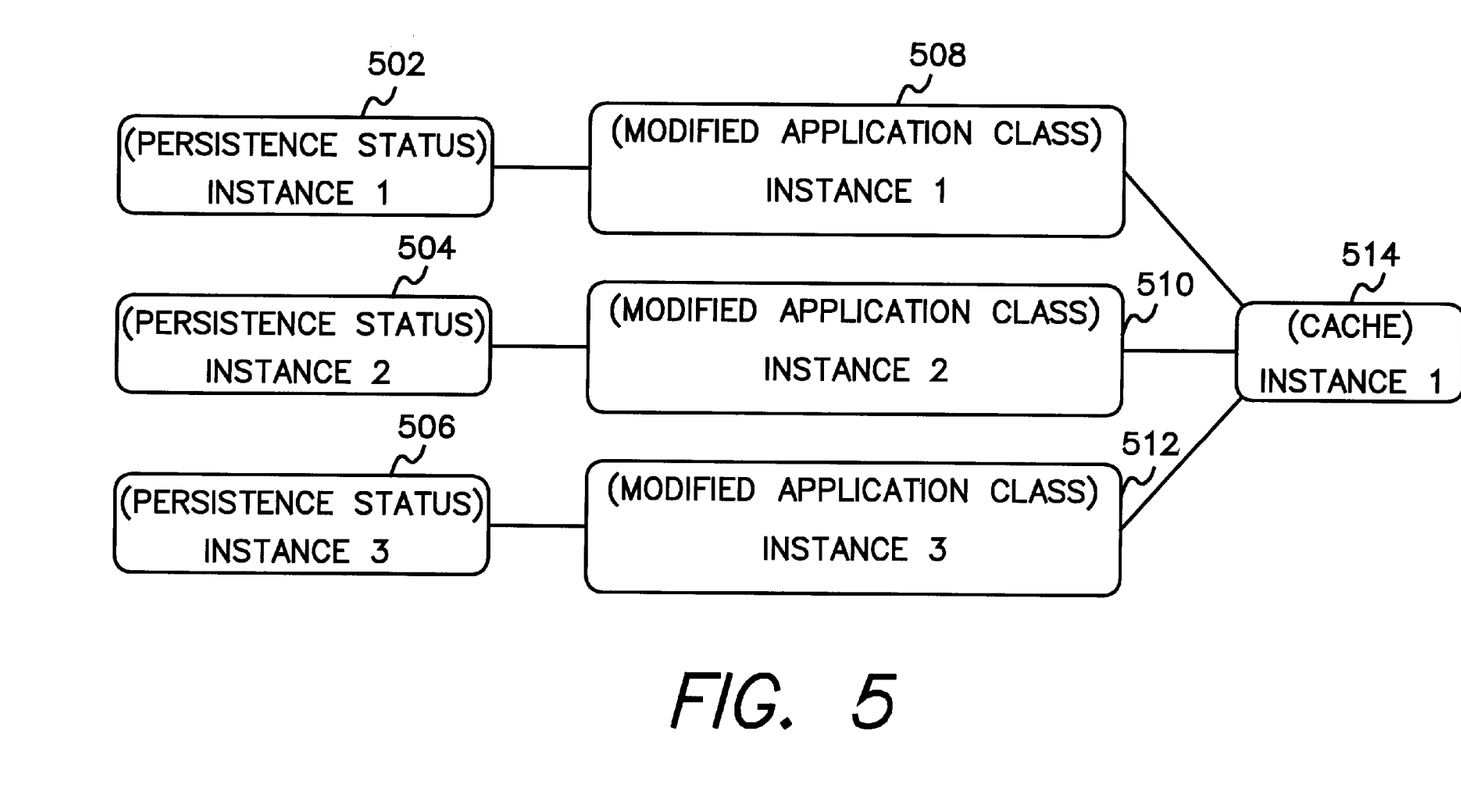
FIG. 5 shows an object instance diagram of a sample application, including the objects included in the caching portion of the invention.

FIG. 5 shows how the sub-objects and objects that are used for the cache are related. Objects 508, 510, and 512 represent three objects of the modified application class 406. Each of these objects has its own persistence status object 502, 504, and 506 respectively, allowing each to independently maintain its own persistence state. The three objects 508, 510, and 512 share a single cache object 514. The cache object 514 is also shared with any other objects of the modified application class.

As shown in FIG. 5, each modified application class 406 has its own cache 514 that is used to hold objects of the modified application class. Static functions are called directly through the class, instead of requiring a reference to a specific object of the class. This allows the cache to be accessed before any objects of the class have been created or from a function which does not have a reference to an existing object. Static data structures allow the class to maintain information about the cache that is independent of the individual objects of the cache.

The individual objects of the modified application class 406 in FIG. 4, maintain their own cache status. In the preferred embodiment, cache status includes both an on-cache status data field and a persistence status sub-object 414. In an alternative embodiment, either of these could be used alone to implement the associated portions of the functionality. The on-cache status data field indicates whether a specific object is currently available on the cache. Maintaining on-cache status information supports the option of performing non-cached retrieves, for performance reasons, and simplifies the determination of whether a specific object is on the cache. If the system knows that an object will not be used later, it is faster to retrieve it without placing it on the cache. When the object will be used later, the extra time needed to place the object on the cache is offset by the time saved on the later request. Additionally the cache for each class will delete any retrieved objects of that class still in memory and on the cache when the application exits.

The persistence sub-object 414 maintains information about whether the copy of the object which is available within the object oriented environment, referred to as the in-memory copy, is consistent with the copy stored in the relational database 408. This consistency information is maintained as possible states for the object. Possible persistence states for objects within the object oriented environment include:

MEMORY—the object was created within the object oriented environment and has never been written to the database;

RETRIEVED—the object is consistent with the database copy;

DIRTY—the object in memory has been modified, and is inconsistent with a copy existing on the database;

UNRETRIEVED—a copy exists on the database, but values for the in-memory object have not yet been retrieved; and REFRESHING—the data values for the object are in the process of being retrieved from the database.

The UNRETRIEVED status is used for placeholder objects as described above.

One use of the persistence state is to determine the appropriate treatment of an object when the object is stored back into the database or deleted from the database. Objects in the MEMORY state must be inserted into the database as new data. Objects in the DIRTY state must be updated in the database to save the most current data values. Objects in the RETRIEVED and UNRETRIEVED states do not need to be refreshed on the database since they hold data that is consistent with the database. As an option, an application programmer may decide that objects in the RETRIEVED state should be updated in the database. Processing of objects in the REFRESHING state should be deferred until their retrieval is complete.

The class-level approach to caching improves the design of the code by reducing coupling between classes and by eliminating the need for a separate cache object. Coupling is any connection between an object and any other entity such as another object or the cache. Coupling of an object to an entity outside of the class is generally undesirable because the object is then dependent on the outside entity and cannot be re-used in a different application without also including the outside entity. Placing the object cache within the class keeps the coupling within the class. Since objects are normally strongly coupled to their class, this approach does not restrict their re-usability.

By checking each retrieve against the cache, object identity can be enforced. All references to an object with a particular pointer or key value can be resolved to the same copy of that object. This eliminates coherency problems associated with multiple copies being retrieved in response to multiple, separate requests. Coherency problems arise when the data values of one copy of an object are modified but the modification is not reflected in other copies of the object. Subsequent operations using the data values from the two different copies would produce different results. By resolving all references to the same copy of the object, all operations are guaranteed to use the same data values.

The modified application class 406 may be partially, or wholly, composed of sub-objects 418. These are objects of a different class, for example the Personal 204 or Payroll 206 classes, shown in FIG. 2. These sub-objects exist only as components of an object of the modified application class and contain data specific to that modified application class object.

The modified application class 406 may also have one or more associated classes 420. An example of an associated class is the Project Class 208 (FIG. 2). Objects of associated classes contain data which may be shared between many objects of the modified application class or possibly between objects of more than one modified application class. An associated class is not a sub-class of a modified application class, but is a separate entity with independent existence.

A logical view 400 is an abstract class that represents a particular aspect of the modified application class 406. Because the logical view is an abstract class, no objects of the logical view class are created when the system is executed. A logical view may represent the information needed by two different people or groups, for example the three different views of data shown in FIG. 3. A logical view may also represent different sets of information related to the same object.

To implement the logical views 400, one or more view retrievers 412 are created. There is one view retriever that corresponds to each logical view class. The view retrievers retrieve data values from the relational database 408, and reconstruct objects in memory or refresh objects already in memory from those data values. After retrieval, the objects in memory will have the same data values they had when corresponding objects, that is, objects with the same database key, were last saved to the database. These objects may have been last saved while the current instance of the application is running, while a previous instance was running on the same computer system, or while an instance connected to the same database was running on another computer system. Optionally, the reconstructed objects are placed on the cache for each persistent class in the inheritance hierarchy of which the object is an instance.

The generic retriever class 404 contains information about how all of the data fields of the modified application class 406 are stored in the database. This information is contained in the class to database map 410. This mapping information specifies what table and column of the relational database holds each data field of the modified application class. All of the view retrievers 412 are derived classes that inherit the class to database map information from the generic retriever, as indicated by the triangle connector 411. If the mapping information needs to be altered, the change is made within the generic retriever, so that each of the view retrievers automatically receives the change because each view retriever inherits this information from the generic retriever class.

All of the class database map information 410 is available to each view retriever 412, through inheritance from the generic retriever 404, but each view retriever uses a different subset of the mapping information to retrieve different sets of data fields from the relational database 408, such that each view retriever retrieves the information for one logical view class. Additionally, view retrievers for parent classes work together with view retrievers for their derived classes. When a view retriever reconstructs an object, the object must be reconstructed as an instance of the derived class in which it was originally constructed, even if it is retrieved as a member of a list of objects of a parent class. For example, if Employee is a parent class of the derived classes Personnel and Payroll, when a retriever reconstructs a list of objects from class Employee, each Personnel or Payroll object within Employee must be properly constructed. That way, when another view retriever later must respond to a request to retrieve the object as a member of the derived class, the correct object is already on the cache for the derived class.

Figure 6:
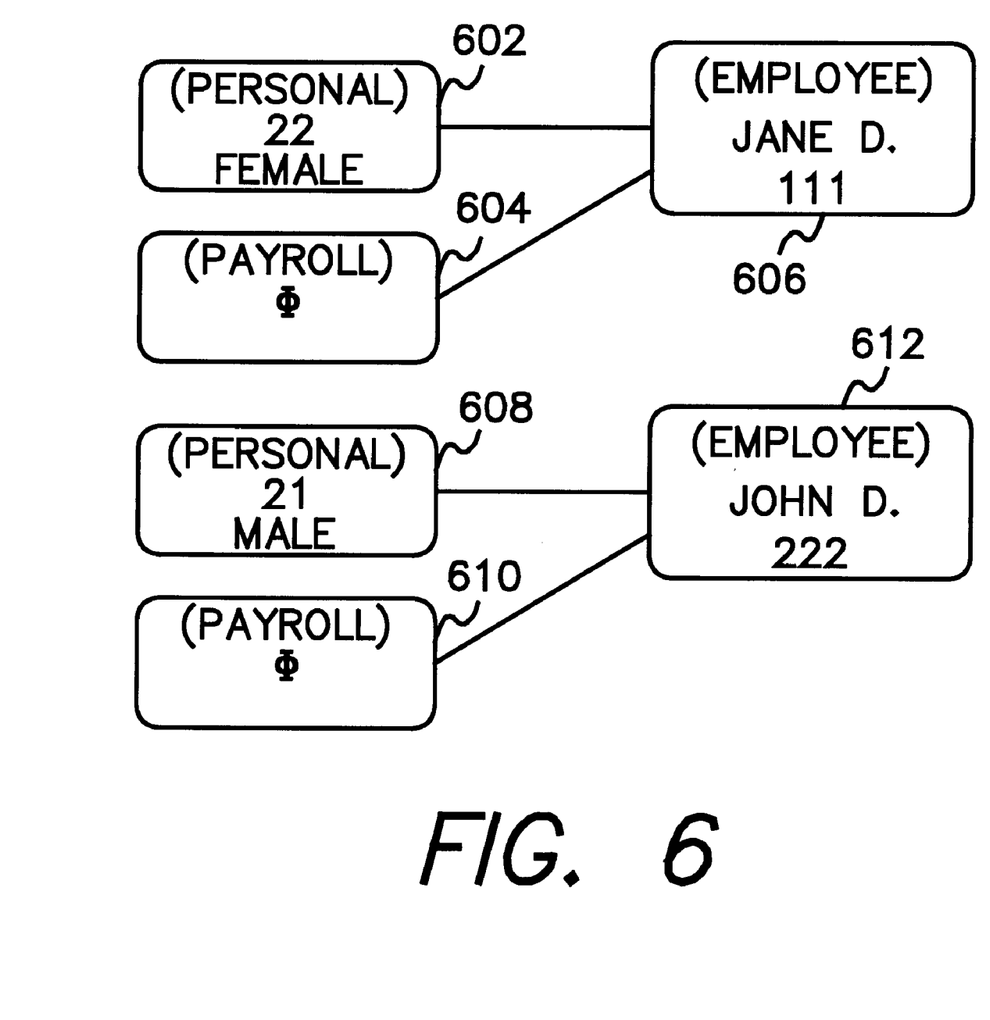
FIG. 6 shows an object instance diagram for the sample application that includes empty sub-objects.

Consider a view retriever that implements the personnel department view 302 in FIG. 3. This view retriever would not need to load values found in the Payroll class, 206 (FIG. 2), because they are not used in the Personnel class. FIG. 6 shows an example of data retrieved by the Personnel view retriever. Two Employee objects, 606 and 612, are created and their data fields read from the database, including data values for their Personal sub-objects 602 and 608. This allows the personnel department view to be presented as shown in FIG. 3. Because data from the Payroll sub-objects 604 and 610 are not needed, objects 604 and 610 have been created but no data values were retrieved from the database for these objects. The symbol Φ shown in Payroll sub-objects 604 and 610 represents a marker used to indicate an empty object. These empty sub-objects are identified by a persistence status of UNRETRIEVED.

Figure 7:
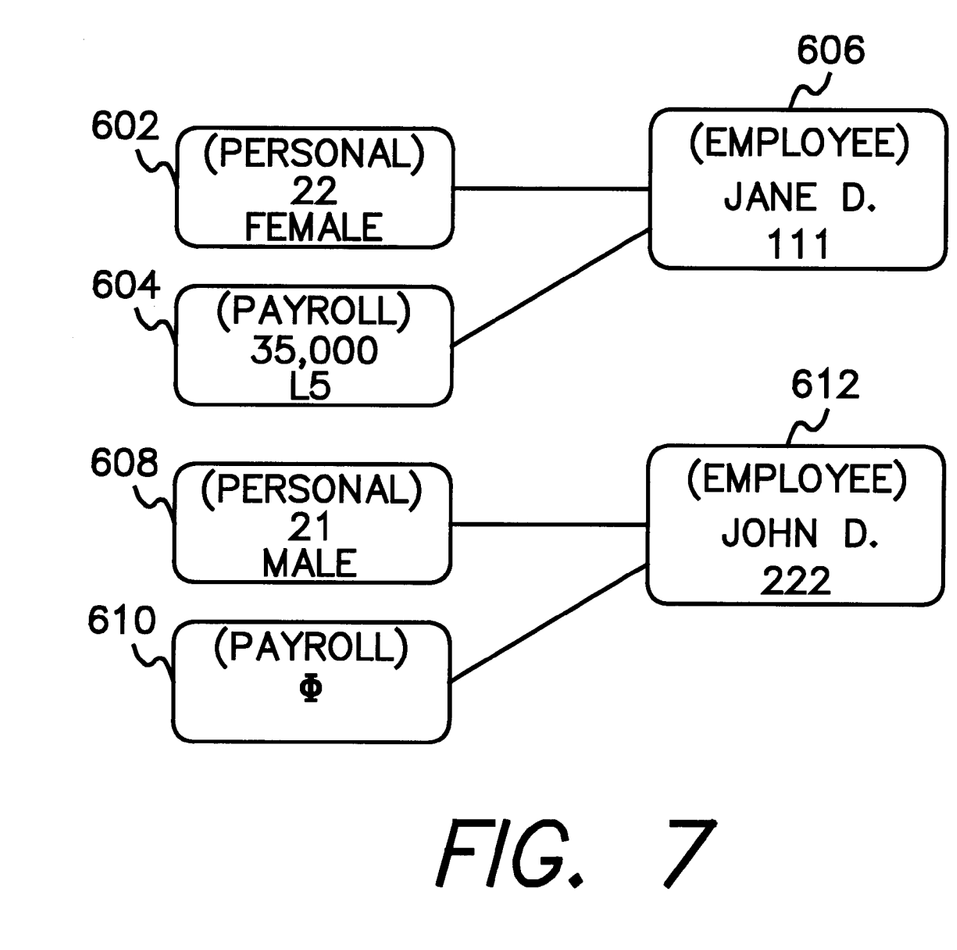
FIG. 7 shows the object instance diagram of FIG. 6 after data has been retrieved for one of the previously empty sub-objects.

A view retriever 412 can also restrict which entries to retrieve. FIG. 7 shows the effect of running a second view retriever that implements the payroll department view 304 of FIG. 3. When this second view retriever is executed, it restricts the data by loading only employee 111, Jane D., but not employee 222, John D. The retrieved payroll information for Jane D. is stored in the Payroll sub-object 604 for Employee object 606, thus "filling-in" object 604, which was already on the cache for the Payroll class with a persistence status of UNRETRIEVED. Because data for the Payroll sub-object 610 for John D. is still not needed, that object remains empty.

The above approach to retrieving data is called a "lazy retrieve." By not retrieving data until it is needed, performance is improved by reducing accesses to the relational database 408, should the data never be needed. Lazy retrieve can be implemented at several levels of granularity. As discussed above, the retrieve can work at the object or sub-object level. If any data field of an object or sub-object is needed, all data fields for the object are retrieved from the relational database. Lazy retrieve can also be implemented at the data field level. In this implementation, only those specific data fields within the object that are needed are retrieved and all other data fields are left empty.

Figure 8:
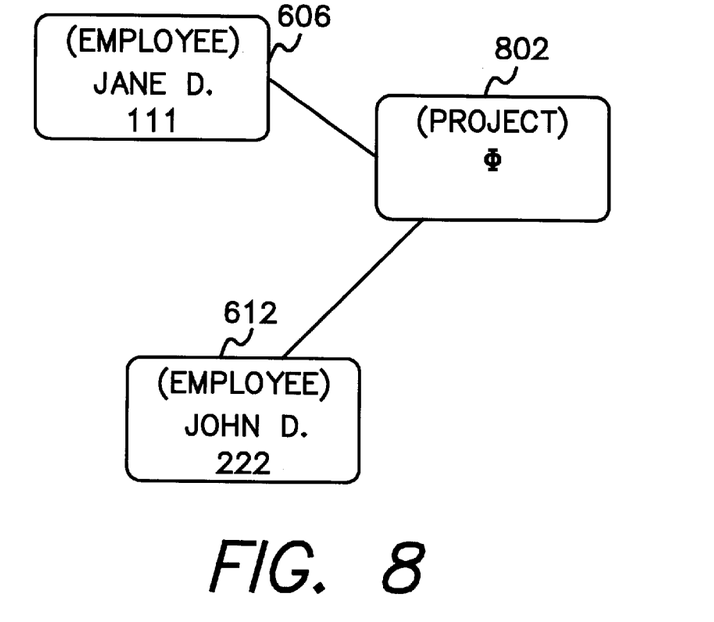
FIG. 8 shows an object instance diagram for the sample application including an empty associated object.
Figure 9:
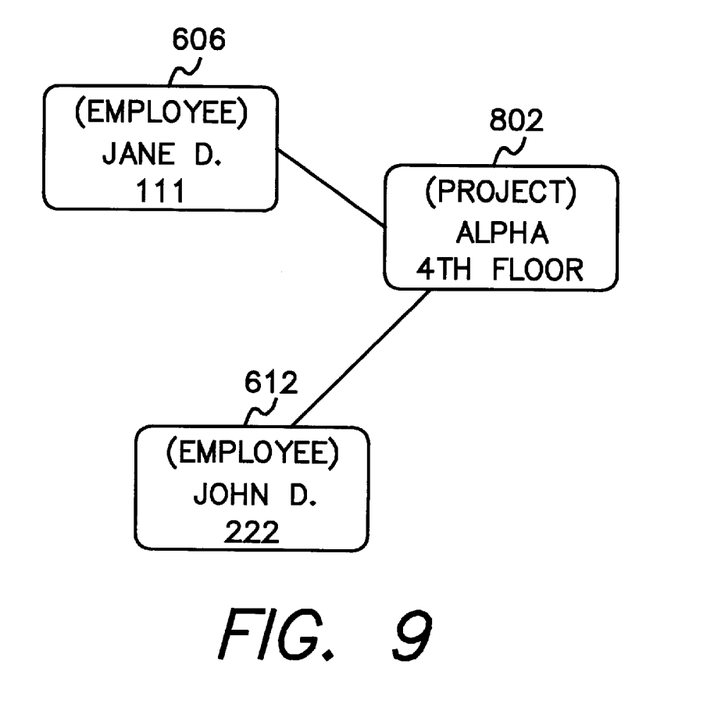
FIG. 9 shows the object instance diagram of FIG. 8 after data has been fetched for the previously empty associated object.

The lazy retrieve process is also applicable to the associated objects 420 in FIG. 4. In the example discussed above, none of the views needed information from the Project class 208, in FIG. 2. Because of this, none of the view retrievers 412 would retrieve data for objects of the Project class. As with the sub-objects, the objects of the Project class are created and marked as empty, when the object is needed. An example of this is shown in FIG. 8, where the Personal and Payroll sub-objects have been removed for clarity. The Employee objects, 606 and 612 contain the data values retrieved from the relational database 408 as described above. If a view retriever implementing the project management view 306 in FIG. 3 is executed, the result is shown in FIG. 9. Employee objects 606 and 612 are unchanged while Project object 802 now contains valid data retrieved from the relational database. The project management view can now be viewed as shown in FIG. 3.

In the preferred embodiment, the lazy retrieve process is supplemented by the use of placeholder objects. In the preferred embodiment, objects or sub-objects marked with the Φ symbol (FIGS. 6, 7, and 8), are placeholder objects. In FIG. 6 the Payroll sub-objects 604 and 610 are placeholder objects as is the Project object 802 in FIG. 8. A conventional object is one which has been created within the object oriented environment, typically in memory, an its data fields have been filled in with values. A placeholder object is an object or sub-object that is allocated in memory but marked as unretrieved, instead of having its data fields filled with data. In the preferred embodiment, this marking consists of setting the object's persistence state to UNRETRIEVED as described above. A variety of other techniques would be apparent to one skilled in the art.

When an object with persistence status UNRETRIEVED receives a request for data, the invention enables the object to retrieve the needed data automatically and change its persistence status to RETRIEVED.

The use of placeholder objects offers advantages both in terms of performance time and code simplicity. Since the placeholder object has been allocated in memory, other objects can reference it as if it were a conventional object containing data. This is illustrated in FIGS. 6 through 8 by the lines connecting the conventional objects to the placeholder objects. As discussed above, a later-executed view retriever will retrieve data into a placeholder object. The performance and code simplicity advantages are realized when data is retrieved for a placeholder object, converting it to a conventional object. Because the data values retrieved from the database are placed into an already existing object, all of the pre-existing references to the original placeholder object are still valid. The placeholder object is converted to a conventional object by retrieving data for the object, but the object still occupies the same location and has the same identity. All other objects which had references to the placeholder object automatically have access to the conventional object. There is no requirement to update the references in these other objects to refer to a newly allocated object. In prior art systems, a new object would be created to hold the retrieved data, and all of the references to the old object would have to be modified to refer to the new object. It is difficult to identify all references to the object.

While also applicable to sub-objects as illustrated in FIGS. 6 and 7, the use of placeholder objects is most easily demonstrated with associated objects as shown in FIGS. 8 and 9. As discussed above, FIG. 8 shows an object instance diagram after one or more retrievers have been executed, but these retrievers did not require data to be retreived for the Project object 802. However, since the Employee objects 606, 612 contained references to the Project object 802, the Project object was created, marked as a placeholder object, and the references in the Employee objects set to refer to the placeholder object. When the view retriever implementing the project management view 306 in FIG. 3 retrieves data for the Project object, the data is stored in the previously allocated placeholder object which automatically converts the placeholder to a conventional object at the same location. The pre-existing references in the Employee objects, which referred to the placeholder object, now point to the conventional Project object containing the data.

Referring back to FIG. 4, the view retrievers 412 access the relational database 408 through an interface provided by the query engine 402. The query engine provides the capability to generate entire query language commands on demand. In the preferred embodiment, the query language used is SQL. By passing parameters to the query engine, including table names, column names, and restrictive clauses, a view retriever can direct the query engine to build up a specific command from its component parts. Included in these requests to the query engine are the table and column names from the class to database map 410 that are needed for the logical view supported by the view retriever. This approach provides complete flexibility in retrieving data values from the relational database while encapsulating the structure of the database. This eliminates the need for an application programmer developing a logical view to know the exact structure of the relational database.

Generating the query language commands on demand permits the programmer to utilize the power of relational database management systems to return precisely the data required using a single query, while staying within the paradigm of object oriented programming. Without the dynamically generated queries provided by the present invention, either multiple query language commands must be embedded within the program, including, for example, the table join commands needed to retrieve data about objects related to the primary objects being retrieved, or multiple queries must be executed for each object retrieved. For example, when retrieving all instances of a particular object together with related data from another class, a separate query for each object may be executed to retrieve the related data instead of joining the related tables to retrieve all he data with on query. A disadvantage of embedding multiple query language commands in the program is that when the database is maintained and table names or column names change, all the queries using that table, including queries specifying joins to that table, must be revised, making maintenance difficult. A disadvantage of using multiple queries is that data retrieval that the database management system could return as one answer set must be retrieved as multiple answer sets, adversely affecting performance. With the system of the present invention, the mapping of a class to the database tables is encapsulated in only one place, improving maintainability. Additionally, queries can be dynamically generated based on those mappings that select the appropriate database columns, join the required database tables, and restrict the returned data based on conditions satisfied by the data values, giving fast performance.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A computer implemented method of accessing data contained in a relational database from within an object oriented environment, the method comprising the steps of:
   (a) storing a data set within the relational database;
   (b) receiving, within the object oriented environment, a request for data from the relational database;
   (c) creating a first object within the object oriented environment, the first object containing at least one reference to a second object, the second object comprising a placeholder object, such that memory space accessible by said object oriented environment is allocated for said first object;
   (d) retrieving data from the data set, wherein the data retrieved comprises data for the first object, but wherein data for the second object is not retrieved;
   (e) storing the data retrieved in step (d) into the first object;
   (f) returning the first object as a response to the request message;
   (g) allocating memory space for said placeholder object; and
   (h) setting at least one reference between said first object and said placeholder object.

2. The computer implemented method of claim 1 wherein the second object comprises a sub-object contained within the first object.

3. The computer implemented method of claim 1 wherein the second object comprises an associated object not contained within the first object.

4. The computer implemented method of claim 1 wherein step (c) further comprises creating the second object.

5. The computer implemented method of claim 4 wherein creating the second object comprises allocating memory for the second object.

6. The computer implemented method of claim 1, wherein step (b) further comprises the steps of:
   (b1) determining whether the requested data is stored as an object on a cache within the object oriented environment;
   (b2) when the data is stored on the cache, returning the object on the cache as a response to the request message, and not performing steps (c) through (f); and
   (b3) when the requested data is not stored as an object on the cache, performing steps (c) through (f), and then placing the first object on the cache storage.

7. The computer implemented method of claim 6 wherein the first object, once created, maintains independent cache status information used by step (b1) to determine whether the requested data is available as an object on the cache.

8. The computer implemented method of claim 7 wherein the cache is implemented through static functions and static data within the first object.

9. The computer implemented method of claim 6 wherein the first object maintains independent persistence status information used by step (b1) to determine whether the requested data is available as an object on the cache.

10. The computer implemented method of claim 6 wherein the cache comprises a separate cache within each class contained within the object oriented environment.

11. The computer implemented method of claim 1 wherein the second object comprises a logical view of the first object.

12. The computer implemented method of claim 1 wherein step (d) comprises the steps of:
   (d1) generating at least one query language command from mapping information stored within a retriever object;
   (d2) sending the query language command to the relational database; and
   (d3) receiving a result of the query language command from the relational database as the retrieved data.

13. A retriever object within an object oriented environment, the retriever object for accessing data contained in a database from within the object oriented environment, said database being arranged in tables and columns, wherein the retriever object comprises:
   means for receiving a request for data from the relational database;
   means for creating a first object within the object oriented environment, the first object containing at least one reference to a second object within the object oriented environment;
   means for generating a query command for retrieving data from the database, wherein the data retrieved comprises data for the first object, the query command being in the query language of the relational database, and wherein said means for generating provides said query command with mapping data, said mapping data comprising table and column identifiers, and is responsive to the request;
   means for storing the data retrieved into the first object; and
   means for returning the first object as a response to the request message;
   wherein said retriever object inherits said mapping data from a generic view retriever class.

14. The retriever object of claim 13 wherein the second object comprises a sub-object contained within the first object.

15. The retriever object of claim 13 wherein the second object comprises an associated object not contained within the first object.

16. The retriever object of claim 13, wherein said first object is a logical view of the requested data.

17. The retriever object of claim 13, wherein the means for retrieving data from the database further comprises:
   means for determining whether the requested data is stored as an object on a cache within the object oriented environment;

means for returning the object on the cache as a response to the request message, when the requested data is stored on the cache; and means for storing data retrieved from the database on the cache.

18. The retreiver object of claim 17 wherein the cache comprises a separate cache within each class contained within the object oriented environment.

19. The retriever object of claim 13 wherein said requested data is data from a number of objects and wherein said first object is a logical view providing said data.

20. A computer implemented method of accessing data contained in a relational database from within an object oriented environment, comprising the steps of:

(a) storing a data set within the relational database;

(b) receiving, within the object oriented environment, a request for data from the relational database;

(c) creating an object within the object oriented environment;

(d) retrieving data from the data set, wherein the data retrieved comprises data for the object;

(e) storing the data retrieved in step (d) into the object on a cache such that said object has a status property for indicating whether an object is available on the cache and wherein said cache status may indicate an object that has been retrieved but not put on the cache; and, (f) returning the first object as a response to the request message.

21. A computer implemented method of accessing data contained in a relational database from within an object oriented environment, the method comprising the steps of:

(a) storing a data set within the relational database;

(b) receiving, within the object oriented environment, a request for data from the relational database;

(c) creating an object within the object oriented environment;

(d) retrieving data from the data set, wherein the data retrieved comprises data for the object;

(e) storing the data retrieved in step (d) into the object;

(f) returning the first object as a response to the request message;

(g) providing said object with a status for determining whether the object stored in the cache is consistent with the data stored in the data storage area, wherein the status comprises a dirty state, the dirty state indicating that an object has been modified and is not consistent with the data stored in the data storage area.

* * * * *